(12) United States Patent
Takagi

(10) Patent No.: US 10,162,253 B2
(45) Date of Patent: Dec. 25, 2018

(54) ILLUMINATION DEVICE AND PROJECTOR

(71) Applicant: SEIKO EPSON CORPORATION, Tokyo (JP)

(72) Inventor: Kunihiko Takagi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/669,181

(22) Filed: Aug. 4, 2017

(65) Prior Publication Data

US 2018/0059523 A1 Mar. 1, 2018

(30) Foreign Application Priority Data

Aug. 24, 2016 (JP) .................................. 2016-163343

(51) Int. Cl.
| | |
|---|---|
| *F21V 9/00* | (2018.01) |
| *G03B 21/20* | (2006.01) |
| *F21V 9/30* | (2018.01) |
| *F21V 5/00* | (2018.01) |
| *F21V 5/04* | (2006.01) |
| *F21V 13/14* | (2006.01) |
| *F21Y 115/30* | (2016.01) |
| *G03B 33/12* | (2006.01) |
| *F21Y 113/10* | (2016.01) |

(52) U.S. Cl.
CPC ............ *G03B 21/204* (2013.01); *F21V 5/008* (2013.01); *F21V 5/04* (2013.01); *F21V 9/30* (2018.02); *F21V 13/14* (2013.01); *G03B 21/208* (2013.01); *G03B 21/2053* (2013.01); *G03B 21/2066* (2013.01); *F21Y 2113/10* (2016.08); *F21Y 2115/30* (2016.08); *G03B 33/12* (2013.01)

(58) Field of Classification Search
USPC .......................................................... 362/84
See application file for complete search history.

(56) References Cited

U.S. PATENT DOCUMENTS

| | | | |
|---|---|---|---|
| 8,733,940 B2 | 5/2014 | Tanaka et al. | |
| 2012/0140183 A1 | 6/2012 | Tanaka et al. | |
| 2013/0083509 A1* | 4/2013 | Ko ......................... | G02B 5/207 362/84 |
| 2014/0009692 A1* | 1/2014 | Sato ......................... | F21K 9/00 348/760 |

(Continued)

FOREIGN PATENT DOCUMENTS

JP 2012-137744 A 7/2012

*Primary Examiner* — Tuyen K Vo
(74) *Attorney, Agent, or Firm* — Oliff PLC

(57) ABSTRACT

An illumination device includes a first light source section adapted to emit first colored light having a peak wavelength at a first wavelength, a second light source section adapted to emit second colored light having a peak wavelength at a second wavelength, a wavelength conversion element adapted to convert a part of the first colored light and a part of the second colored light into third colored light, and then emit another part of the first colored light, another part of the second colored light, and the third colored light, and a control section adapted to individually control an amount of light per unit time of the first colored light emitted from the first light source section, and an amount of light per unit time of the second colored light emitted from the second light source section.

6 Claims, 7 Drawing Sheets

(56) References Cited

U.S. PATENT DOCUMENTS

| | | | | |
|---|---|---|---|---|
| 2014/0029237 A1* | 1/2014 | Mehl | ............................ | F21V 9/08 |
| | | | | 362/84 |
| 2014/0055754 A1* | 2/2014 | Chuang | ................ | G03B 21/005 |
| | | | | 353/20 |
| 2014/0160441 A1* | 6/2014 | Kim | ...................... | G03B 21/204 |
| | | | | 353/33 |
| 2014/0247429 A1* | 9/2014 | Ogino | ................... | H04N 9/3111 |
| | | | | 353/31 |
| 2014/0253882 A1* | 9/2014 | King | .................... | G02B 26/008 |
| | | | | 353/31 |
| 2015/0098065 A1* | 4/2015 | Tanaka | ................ | G03B 21/2013 |
| | | | | 353/84 |
| 2016/0054574 A1* | 2/2016 | Huang | ................ | H04N 13/0431 |
| | | | | 349/33 |
| 2017/0160548 A1* | 6/2017 | Woltman | ............ | G02B 27/4205 |

\* cited by examiner

ILLUMINATION DEVICE AND PROJECTOR

BACKGROUND

1. Technical Field

The present invention relates to an illumination device and a projector.

2. Related Art

In the past, there has been known a projector, which modulates light emitted from an illumination device to thereby form an image corresponding to image information, and projects the image on a projection target surface such as a screen in an enlarged manner. As such a projector, there is known a projector provided with a light source device having a solid-state light source and a fluorescence emitting plate (see, e.g., JP-A-2012-137744 (Document 1)).

In the projector described in Document 1, the light source device is provided with a solid-state light source unit, two wave plates, a dichroic mirror, a fluorescence emitting plate, and a reflecting plate. Among these constituents, the solid-state light source unit emits excitation light as blue light, and one of the wave plates makes first polarization component and a second polarization component generated by converting the polarization direction of the excitation light enter the dichroic mirror. The dichroic mirror performs polarization separation on the first polarization component and the second polarization component. The fluorescence emitting plate emits fluorescence including components of green and red due to the excitation light of the first polarization component. The other of the wave plate converts the excitation light of the second polarization component into the circularly-polarized excitation light, and the reflecting plate reflects the excitation light having been transmitted through the wave plate, and makes the reflected light enter the wave plate again.

Then, the dichroic mirror described above transmits the fluorescence irrespective of the polarization direction. Therefore, the fluorescence generated in the fluorescence emitting plate is transmitted through the dichroic mirror, and the excitation light having been reflected by the reflecting plate and then transmitted through the other of the wave plates described above is reflected by the dichroic mirror toward the same direction as the proceeding direction of the fluorescence. Thus, white illumination light formed of the excitation light as the blue light and the fluorescence including the green light and the red light is emitted from the light source device.

Incidentally, in the light source device described in Document 1 mentioned above, in the configuration of separating the excitation light used as the blue light using the dichroic mirror, and combining the excitation light with the fluorescence generated by the fluorescence emitting plate, the reflecting plate and the wave plate for reflecting the excitation light become necessary. There is a problem that such a light source device is difficult to miniaturize.

In contrast, it is possible to adopt a configuration of making roughly the whole of the excitation light having been emitted from the solid-state light source unit enter the fluorescence emitting plate, converting a part of the excitation light into fluorescence, and using an unconverted part of the excitation light as the blue light.

However, in such a configuration, there is a problem that it is difficult to control the color tone of the illumination light emitted from the light source device.

SUMMARY

An advantage of some aspects of the invention is to provide an illumination device and a projector capable of controlling the color tone of the illumination light.

An illumination device according to a first aspect of the invention includes a first light source section adapted to emit first colored light having a peak wavelength at a first wavelength, a second light source section adapted to emit second colored light having a peak wavelength at a second wavelength different from the first wavelength, a wavelength conversion element adapted to convert a part of the first colored light and a part of the second colored light into third colored light different in wavelength from the first colored light and the second colored light, and then emit another part of the first colored light, another part of the second colored light, and the third colored light, and a control section adapted to individually control an amount of light per unit time of the first colored light emitted from the first light source section, and an amount of light per unit time of the second colored light emitted from the second light source section.

According to the first aspect, the control section described above controls an amount of emitted light per unit time of the first colored light emitted from the first light source section, and an amount of emitted light per unit time of the second colored light emitted from the second light source section. According to this configuration, the light intensity balance between the first colored light and the second colored light in the illumination light emitted from the wavelength conversion element, by extension, from the illumination device can be controlled. Since the first colored light and the second colored light are different in peak wavelength from each other, by controlling the light intensity balance, the color tone of the illumination light described above can be controlled.

In the first aspect described above, it is preferable that the wavelength conversion element has a characteristic that emission efficiency in emitting the third colored light from the first colored light entering the wavelength conversion element, and emission efficiency in emitting the third colored light from the second colored light entering the wavelength conversion element are different from each other.

It should be noted that such emission efficiency can be obtained by, for example, the product of the absorption ratio of the light to the phosphor provided to the wavelength conversion element and the conversion efficiency of the light thus absorbed into the third colored light.

According to such a configuration, in the case in which, for example, the first colored light and the second colored light are the colored light recognized as the same color, by increasing or decreasing the proportion of the light intensity of one of the first colored light and the second colored light entering the wavelength conversion element, it is possible to increase or decrease the proportion of the light intensity of the third colored light to the proportion of the total light intensity of the first colored light and the second colored light emitted from the wavelength conversion element in addition to the color tone control of the illumination light due to the control of the light intensity balance between the first colored light and the second colored light. Therefore, it is possible to control the light intensity balance between the first colored light and the second colored light, and the third colored light in the illumination light emitted from the illumination device, and thus it is possible to control the color tone of the illumination light.

In the first aspect described above, it is preferable that there is further included a reflecting section located on an exit side of the third colored light with respect to the wavelength conversion element, and adapted to transmit the third colored light and reflect a part of the first colored light and a part of the second colored light and the reflecting section has a characteristic that transmittance of the first colored light and transmittance of the second colored light are different from each other.

It should be noted that the reflecting section can be located in the wavelength conversion element, or can also be configured as a separated body from the wavelength conversion element.

According to such a configuration, in the case in which, for example, the first colored light and the second colored light are the colored light recognized as the same color, by increasing or decreasing the proportion of the light intensity of one of the first colored light and the second colored light entering the reflecting section, it is possible to increase or decrease the total light intensity of the first colored light and the second colored light emitted from the illumination device via the reflecting section in addition to the color tone control of the illumination light due to the control of the light intensity balance between the first colored light and the second colored light. Further, accordingly, it is possible to control the proportion of the total light intensity of the first colored light and the second colored light and the proportion of the light intensity of the third colored light in the illumination light emitted from the illumination device. Therefore, it is possible to control the light intensity balance between the first colored light and the second colored light, and the third colored light in the illumination light, and thus it is possible to control the color tone of the illumination light.

In the first aspect described above, it is preferable that an illumination area by the first colored light and an illumination area by the second colored light in the wavelength conversion element roughly coincide with each other.

According to such a configuration, it is possible to homogenize the light intensity distribution of the first colored light and the second colored light, and by extension, the light intensity distribution of the first colored light, the second colored light, and the third colored light in the illumination light emitted from the wavelength conversion element, by extension, from the illumination device. Therefore, it is possible to prevent the color variation from occurring in the illumination light.

A projector according to a second aspect of the invention includes the illumination device described above, a light modulation device adapted to modulate light emitted from the illumination device, and a projection optical device adapted to project the light modulated by the light modulation device.

According to the second aspect described above, substantially the same advantages as those of the illumination device according to the first aspect described above can be exerted. Besides the above, since it is possible to project the image based on the illumination light with the color tone controlled, it is possible to project an image having the color tone corresponding to the purpose, and thus, the convenience of the projector can be improved. Further, since the color tone of the illumination light emitted from the illumination device can be controlled, it is also possible to perform the correction of the color misalignment due to the deterioration of the optical component, and the adjustment of the color shade corresponding to the color mode set by the user or the like. Such an adjustment of the color tone is not only the adjustment of the color tone by reducing the light such as the adjustment of the color tone by the light modulation element. Therefore, it is possible to enhance the use efficiency of the light for forming the image, and thus, it is possible to project the image good in color reproducibility and high in luminance.

BRIEF DESCRIPTION OF THE DRAWINGS

The invention will be described with reference to the accompanying drawings, wherein like numbers reference like elements.

DESCRIPTION OF EXEMPLARY
EMBODIMENTS

First Embodiment

A first embodiment of the invention will hereinafter be described based on the accompanying drawings.
Schematic Configuration of Projector FIG. 1 is a schematic diagram showing a configuration of a projector 1 according to the present embodiment.

Figure 1:
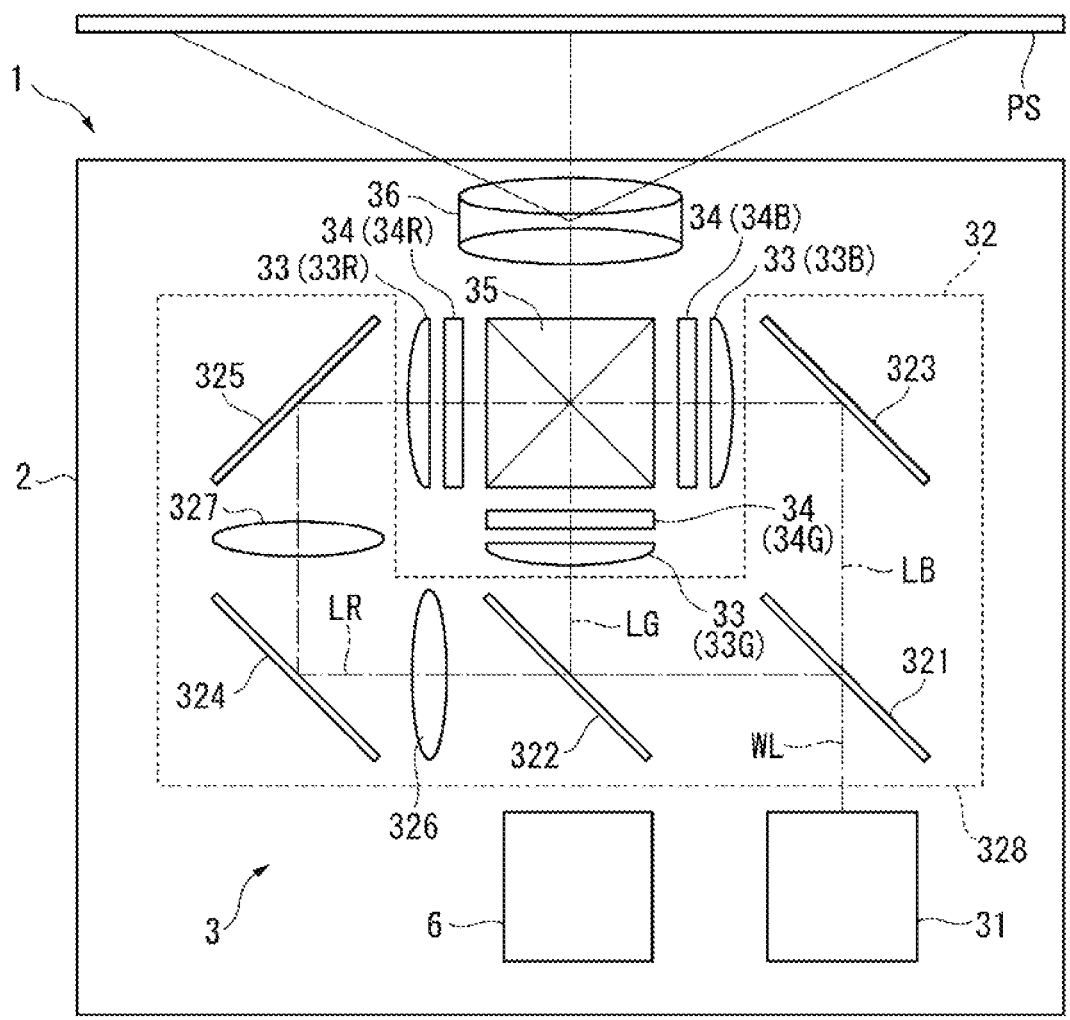
FIG. 1 is a schematic diagram showing a configuration of a projector according to a first embodiment of the invention.

As shown in FIG. 1, the projector 1 according to the present embodiment is an image display device for modulating the light beam emitted from an illumination device 31 disposed inside to thereby form an image corresponding to image information, and then projecting the image on a projection target surface PS such as a screen in an enlarged manner.

Although described later in detail, in the projector 1, the illumination device 31 has two types of solid-state light sources S1, S2 (see FIG. 2) different in peak wavelength of the excitation light emitted therefrom from each other. Further, as one of the features, the projector 1 controls the amount of light per unit time of the first excitation light as the excitation light emitted from the solid-state light source S1 and the amount of light per unit time of the second excitation light as the excitation light emitted from the solid-state light source S2 to thereby control the color tone of the illumination light emitted from the illumination device 31, and by extension, control the color tone of the projection image.

Such a projector 1 is provided with an exterior housing 2 constituting the exterior, and an image projection device 3 and a control device 6 housed in the exterior housing 2. Besides the above, although not shown in the drawings, the projector 1 is provided with a cooling device for cooling a cooling target, and a power supply device for supplying electrical power to electronic components constituting the projector 1.

Among these constituents, the control device 6 controls operations of the projector 1. For example, the control device 6 processes the image information input, and then outputs a drive signal corresponding to the image information to the image projection device 3. Further, the control device 6 controls a lighting device 414 described later to light a light source device 4, and by extension, the illumination device 31.

Configuration of Image Projection Device

The image projection device 3 forms and then projects the image corresponding to the image information described above under the control by the control device 6 described above. The image projection device 3 is provided with the illumination device 31, a color separation device 32, collimating lenses 33, light modulation devices 34, a color combining device 35, and a projection optical device 36 disposed on an illumination light axis set.

Among these constituents, the illumination device 31 emits an illumination light WL as the white light toward the color separation device 32. The configuration of the illumination device 31 will be described later in detail.

The color separation device 32 separates the illumination light WL entering the color separation device 32 from the illumination device 31 into a blue light LB, a green light LG, and a red light LR. The color separation device 32 is provided with dichroic mirrors 321, 322, total reflection mirrors 323, 324, and 325, relay lenses 326, 327, and a housing 328 for optical components for housing these constituents inside.

The dichroic mirror 321 transmits the blue light LB out of the illumination light entering the dichroic mirror 321, while reflecting the other colored light (the green light LG and the red light LR).

The dichroic mirror 322 transmits the red light LR while reflecting the green light LG out of the other colored light described above entering the dichroic mirror 322 via the dichroic mirror 321.

The total reflection mirror 323 is disposed on the light path of the blue light LB, and reflects the blue light LB, which has been transmitted through the dichroic mirror 321, toward the light modulation device 34 (34B).

The total reflection mirrors 324, 325 are disposed in the light path of the red light LR, and guides the red light LR, which has been transmitted through the dichroic mirror 322, to the light modulation device 34 (34R). It should be noted that the green light LG is reflected by the dichroic mirror 322 toward the light modulation device 34 (34G).

The relay lenses 326, 327 are disposed on the light path of the red light LR thus separated from. These relay lenses 325, 327 have a function of compensating a light loss of the red light LR due to the fact that the light path length of the red light LR becomes longer than the light path length of the blue light LB or the green light 1G.

The collimating lenses (the collimating lenses for red, green, and blue are denoted by 33R, 33G, an 33B, respectively) are each disposed on the light incident side with respect to the light modulation device 34, and each collimate the light entering the light modulation device 34.

The light modulation devices 34 (the light modulation devices for red, green, and blue are denoted by 34R, 34G, and 34B, respectively) respectively modulate the incident colored light to thereby form the colored image corresponding to the image information described above. In the present embodiment, each of these light modulation devices 34 is configured including a liquid crystal panel for modulating the incident light, and an incident side polarization plate and an exit side polarization plate located on the light incident side and the light exit side of the liquid crystal panel.

The modulated light beams (the colored images corresponding respectively to the colored light LB, the colored light LG, and the colored light LR) from the respective light modulation devices 34R, 34G, and 34B enter the color combining device 35. The color combining device 35 combines the modulated light beams with each other to form the image light of the projection image, and then emits the image light to the projection optical device 36. Such the color combining device 35 is formed of the cross dichroic prism in the present embodiment, but can also be configured by combining a plurality of dichroic mirrors with each other.

The projection optical device 36 projects the image light combined by the color combining device 35 on the projection target surface PS to thereby display the projection image on the projection target surface PS. As such a projection optical device 36, there can be adopted a combination lens having a plurality of lenses and a mirror tube for housing the plurality of lenses.

Configuration of Illumination Device

Figure 2:
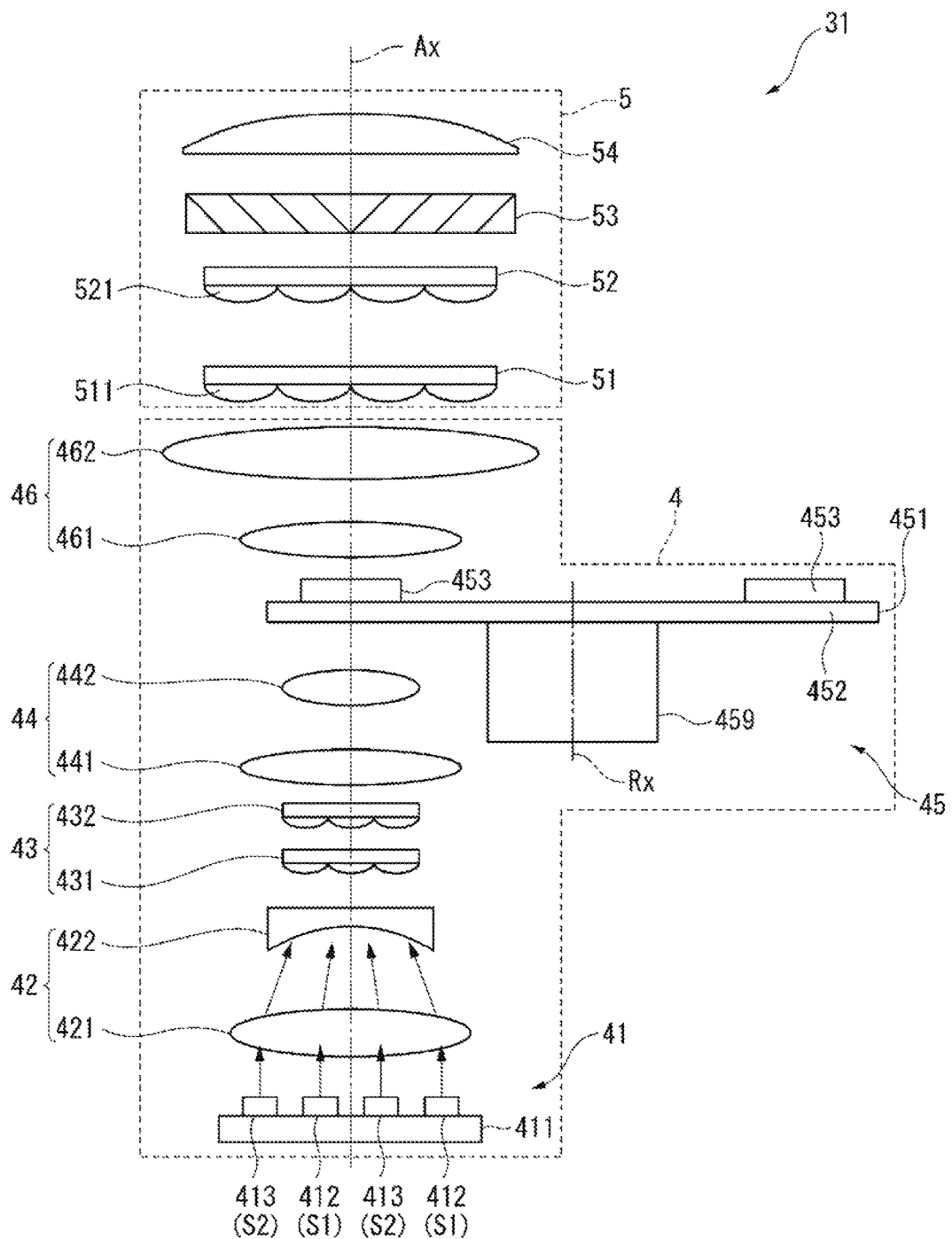
FIG. 2 is a schematic diagram showing a configuration of an illumination device according to the first embodiment.

FIG. 2 is a schematic diagram showing a configuration of the illumination device 31.

As shown in FIG. 2, the illumination device 31 is provided with the light source device 4 and a homogenization device 5.

The light source device 4 emits the illumination light describe above to the homogenization device 5. The light source device 4 is provided with a light source section 41, an a focal optical device 42, a homogenizer optical device 43, a first pickup optical device 44, a wavelength conversion device 45, and a second pickup optical device 46. Further, these constituents are disposed on the illumination light axis Ax as the illumination light axis described above extending linearly.

Figure 3:
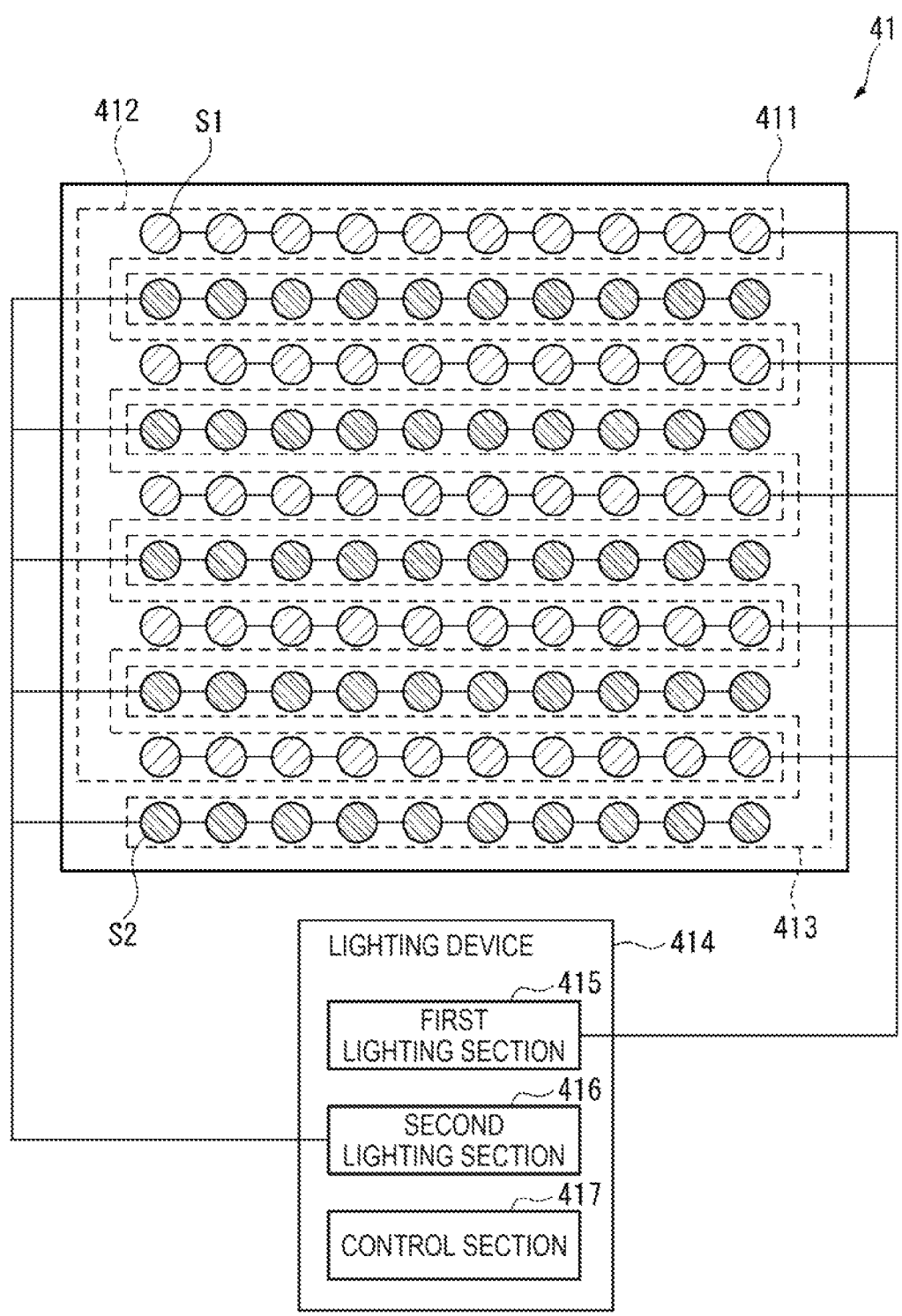
FIG. 3 is a schematic diagram showing an arrangement of a first light source section and a second light source section in the first embodiment.

The light source section 41 has an array light source 411, a collimator optical device (not shown), and the lighting device 414 (see FIG. 3).

The array light source 411 has a configuration in which a plurality of solid-state light sources S1, S2 arranged in an array in a perpendicular surface to the illumination light axis Ax described above, and emits the excitation light as the blue light toward the a focal optical device 42. The array light source 411 has a first light source section 412 and a second light source section 413 different in peak wavelength of the excitation light emitted therefrom from each other.

In the present embodiment, the first light source section 412 is configured including a plurality of solid-state light sources S1, each of which is a laser diode (LD) for emitting the first excitation light having the peak wavelength at 460 nm (the first wavelength). The first excitation light corresponds to the first colored light.

In the present embodiment, the second light source section 413 is configured including a plurality of solid-state light sources S2, each of which is an LD for emitting the second excitation light as the laser beam having the peak wavelength at 440 nm (the second wavelength). The second excitation light corresponds to the second colored light.

FIG. 3 is a schematic diagram showing an arrangement of the first light source section 412 and the second light source section 413 in the array light source 411. It should be noted that in FIG. 3, only some of the solid-state light sources S1, S2 are attached with reference symbols.

In the array light source 411 described above, as shown in FIG. 3, the solid-state light sources S1, S2 are arrange in a matrix. Specifically, in the example shown in FIG. 3, the solid-state light sources S1, S2 are arranged in a 10×10 matrix, wherein the solid-state light sources S1 are arranged along the odd rows, and the solid-state light sources S2 are arranged along the even rows. The solid-state light sources S1 are lit by a first lighting section 415 constituting the lighting device 414, and the solid-state light sources S2 are lit by a second lighting section 416 similarly constituting the lighting device 414.

By arranging the solid-state light sources S1, S2 in such a manner, it is possible to prevent bias from occurring in the distribution of the first excitation light and the distribution of the second excitation light in the excitation light emitted from the array light source 411.

It should be noted that in the example shown in FIG. 3 described above, the solid-state light sources S1, S2 are assumed to be arranged in a 10×10 matrix, but the arrangement is not limited to this example, and the number of rows and the number of columns can arbitrarily be changed.

Further, it is also possible for the solid-state light sources S1 to be arranged along the even rows, and the solid-state light sources S2 to be arranged along the odd rows, or it is also possible for either one of the solid-state light sources S1, S2 to be arranged along the odd columns, and the other thereof to be arranged along the even columns. Further, it is also possible for the solid-state light sources S1, S2 to be alternately arranged in each of the row direction and the column direction, or to be arranged in a random manner.

Although not shown in the drawings, the collimator optical device collimates the excitation light entering the collimator optical device from the array light source 411, and then makes the result enter the a focal optical device 42. As the collimator optical device, there can be illustrated a configuration in which a plurality of collimator lenses correspond respectively to the solid-state light sources S1, S2 is arranged in an array.

The lighting device 414 controls the lighting state of each of the solid-state light sources S1, S2 under the control by the control device 6. The configuration of and the function of such a lighting device 414 will be described later in detail.

As shown in FIG. 2, the a focal optical device 42 controls the light beam diameter of the excitation light entering the a focal optical device 42 from the light source section 41. The a focal optical device 42 is provided with a collecting lens 421 and a collimating lens 422.

The homogenizer optical device 43 homogenizes the illuminance distribution of the illumination target area (a wavelength conversion layer 453 of the wavelength conversion device 45) by the excitation light entering the homogenizer optical device 43 from the light source device 41 via the a focal optical device 42 together with the first pickup optical device 44. The homogenizer optical device 43 is provided with multi-lenses 431, 432 each having a plurality of small lenses arranged in a matrix in a perpendicular surface to the illumination light axis Ax.

The first pickup optical device 44 collects the excitation light entering the first pickup optical device 44 from the homogenizer optical device 43, and then makes the excitation light thus collected enter the wavelength conversion device 45 (the wavelength conversion layer 453). In the present embodiment, the first pickup optical device 44 is configured including two pickup lenses 441, 442. However, the configuration is not limited to this example, but the number of lenses constituting the first pickup optical device 44 can arbitrarily be changed.

The wavelength conversion device 45 converts a part of the excitation light (the first excitation light and the second excitation light), which enters the wavelength conversion device 45 from the first pickup optical device 44, into the fluorescence (third colored light having a peak wavelength in the wavelength band of 500 through 700 nm) including the green light and the red light, and then outputs the fluorescence, and at the same time transmits and emits another part thereof. The wavelength conversion device 45 is provided with a wavelength conversion element 451, and a rotary device 459 such as a motor for rotating the wavelength conversion element 451.

The wavelength conversion element 451 includes a substrate 452, and the wavelength conversion layer 453 located on a light exit side surface of the substrate 452. It should be noted that the wavelength conversion layer 453 can be located on the incident side surface of the substrate 452 for the excitation light.

Among these constituents, the substrate 452 is formed of a light transmissive material such as glass so as to have a disk-like shape. The substrate 452 and the rotary device 459 are disposed so that the rotational axis Rx of the substrate 452 is parallel to the illumination light axis Ax described above. Further, by rotating the substrate 452 with the rotary device 459, the substrate 452, and by extension, the wavelength conversion layer 453 located on the substrate 452 are cooled.

The wavelength conversion layer 453 converts a part of the excitation light out of the incident excitation light into the fluorescence described above, and then emits the result, and at the same time, transmits and then emits the rest of the excitation light. In other words, the wavelength conversion layer 453 emits the fluorescence including the green light and the red light, and the excitation light as the blue light. The wavelength conversion layer 453 is formed on the substrate 452 so as to have a ring-like shape centered on the rotational axis Rx described above.

Such the wavelength conversion layer 453 is configured including a phosphor for performing the wavelength conversion from the excitation light into the fluorescence. The phosphor is different in absorption ratio of the excitation light by the wavelength.

Figure 4:
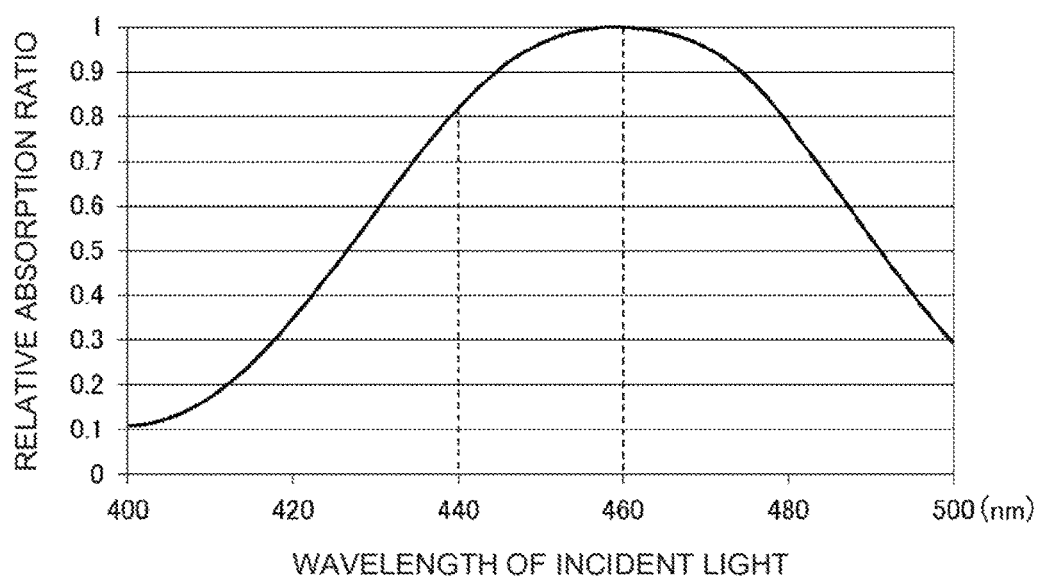
FIG. 4 is a diagram showing a light absorption characteristic of a phosphor included in a wavelength conversion layer in the first embodiment.

FIG. 4 is a diagram (a graph) showing a light absorption characteristic of the phosphor included in the wavelength conversion layer 453. It should be noted that in FIG. 4, the wavelength at which the light is the most efficiently absorbed by the phosphor is defined as the maximum absorption wavelength, and the light absorption ratio at each wavelength is shown as a relative absorption ratio assuming the absorption ratio of the light with the maximum absorption ratio as 1.

In the example shown in FIG. 4, in the phosphor included in the wavelength conversion layer 453, the absorption ratio is different between the light with the wavelength of 460 nm and the light with the wavelength of 440 nm. Specifically, the relative absorption ratio of the phosphor is roughly 1 at 460 nm on the one hand, and is roughly 0.8 at 440 nm on the other hand.

As described above, in the phosphor included in the wavelength conversion layer 453, the absorption ratio of the first excitation light having the peak wavelength of 460 nm and the absorption ratio of the second excitation light having the peak wavelength of 440 nm are different from each other. Therefore, the wavelength conversion layer 453, and by extension, the wavelength conversion element 451 has the characteristic in which the emission efficiency of the fluorescence emitted due to the first excitation light when the first excitation light with a certain light intensity enters the wavelength conversion layer 453 and the emission efficiency of the fluorescence emitted due to the second excitation light when the second excitation light with the same light intensity enters the wavelength conversion layer 453 are different from each other. Specifically, since in the wavelength conversion layer 453, the absorption ratio of the first excitation light is higher than the absorption ratio of the second excitation light, the emission efficiency of the fluorescence due to the first excitation light is higher than the emission efficiency of the fluorescence due to the second excitation light.

Therefore, by increasing or decreasing the proportion of the light intensity of one of the first excitation light and the second excitation light entering the wavelength conversion element 451, the proportion of the light intensity of the fluorescence to the proportion of the total light intensity of the first excitation light and the second excitation light emitted from the wavelength conversion element 451 can be increased or decreased. For example, by making the proportion of the light intensity of the first excitation light, which is higher in emission efficiency of the fluorescence, higher than the proportion of the light intensity of the second excitation light, it is possible to increase the proportion of the light intensity of the fluorescence to the light emitted from the wavelength conversion element 451 to thereby decrease the proportion of the total light intensity of the first excitation light and the second excitation light compared to the case in which these proportions are equal to each other. By controlling the respective light intensities (the amounts of emitted light per unit time) of the first excitation light and the second excitation light as described above, there is controlled the light intensity balance between the first excitation light and the second excitation light, and the fluorescence in the illumination light emitted from the wavelength conversion device 45 (the wavelength conversion element 451).

It should be noted that since the first excitation light and the second excitation light are different in peak wavelength from each other, by controlling the emitted light intensity from the light source section 41 of each of the first excitation light and the second excitation light, the color tone in the blue light region in the illumination light emitted from the wavelength conversion layer 453 is also controlled. For example, if the light intensity of the first excitation light and the light intensity of the second excitation light are equal to each other, since the absorption ratio of the first excitation light is higher than the absorption ratio of the second excitation light in the wavelength conversion element 451 (the phosphor), the proportion of the first excitation light in the illumination light becomes lower than the proportion of the second excitation light.

Such light intensity adjustment, by extension, the color tone adjustment of the illumination light, is performed by the lighting device 414 (a control section 417) of the light source section 41, and the illumination light controlled in the ratio between the light intensity of the blue light and the light intensity of the green light and the red light is emitted to the second pickup optical device 46.

As shown in FIG. 2, the second pickup optical device 46 has a function of collecting the illumination light emitted from the wavelength conversion layer 453 described above, and then making the illumination light enter the homogenization device 5. The second pickup optical device 46 has a collecting lens 461, and a collimating lens 462 for collimating the light collected by the collecting lens 461. It should be noted that the number of the lenses constituting the second pickup optical device 46 is not limited to two, but can arbitrarily be changed.

The homogenization device 5 homogenizes the illuminance in the perpendicular plane to the central axis (coinciding with the illumination light axis Ax) of the illumination light entering the homogenization device 5 from the light source device 4 (the second pickup optical device 46), and by extension, the illuminance distribution of the image forming area (modulation area) as the illumination target area in each of the light modulation devices 34 (34R, 34G, and 34B) described above. The homogenization device 5 is provided with a first lens array 51, a second lens array 52, a polarization conversion element 53, and an overlapping lens 54, wherein these constituents are also arranged so that the optical axes of these constituents coincide with the illumination light axis Ax.

The first lens array 51 has a configuration having a plurality of small lenses 511 arranged in a matrix in a perpendicular plane to the illumination light axis Ax, and divides the illumination light entering the first lens array 51 into a plurality of partial light beams.

Similarly to the first lens array 51, the second lens array 52 has a configuration having a plurality of small lenses 521 arranged in a matrix in the perpendicular plane, and each of the small lenses 521 has one-to-one relationship with corresponding one of the small lenses 511. Therefore, the partial light beam emitted from a certain small lens 511 enters corresponding one of the small lenses 521. These small lenses 521 overlap the plurality of partial light beams divided by the small lenses 511 with each other in the image forming area of each of the light modulation devices 34 in cooperation with the overlapping lens 54.

The polarization conversion element 53 is disposed between the second lens array 52 and the overlapping lens 54, and has a function of uniforming the polarization directions of the plurality of partial light beams entering the polarization conversion element 53.

Configuration of Lighting Device

As shown in FIG. 3, the lighting device 414 includes the first lighting section 415, the second lighting section 416, and the control section 417, and controls the lighting state of each of the solid-state light sources S1, S2.

The first lighting section 415 lights each of the solid-state light sources S1 constituting the first light source section 412 described above. Similarly, the second lighting section 416 lights each of the solid-state light sources S2 constituting the second light source section 413 described above. On this occasion, the first lighting section 415 and the second lighting section 416 controls the amount of emitted light per unit time of each of the solid-state light sources S1, S2, and by extension, the amount of emitted light per unit time from the first light source section 412 and the second light source section 413 using the duty ratio between the lighting time and the extinction time per unit time, or the voltage applied to each of the solid-state light sources S1, S2.

The control section 417 controls the first lighting section 415 and the second lighting section 416 to control the amount of emitted light per unit time of each of the first excitation light and the second excitation light from the first light source section 412 and the second light source section 413, to thereby control the color tone of the illumination light, and by extension, the color tone of the projection image as described above.

It should be noted that in the present embodiment, the control section 417 controls the color tone of the illumination light to be the color tone corresponding to the control signal input from the control device 6 in accordance with the input operation of the user to the projector 1. However, besides the above, in the case in which a sensor for detecting the wavelength distribution of the illumination light emitted from the light source device 4 or the illumination device 31 is provided, it is possible for the control section 417 to automatically control the color tone of the illumination light so as to achieve a preset wavelength distribution. Further, it is also possible for the control section 417 to control the color tone of the illumination light in accordance with a color mode set by the user.

According to the projector 1 related to the present embodiment described hereinabove, the following advantages are obtained.

The wavelength conversion element 451 includes the phosphor different in absorption ratio between the first excitation light and the second excitation light. In other words, the wavelength conversion element 451 has a characteristic that the emission efficiency of the fluorescence due to the first excitation light and the emission efficiency of the fluorescence due to the second excitation light are different from each other.

According to this configuration, as described above, by the control section 417 controlling the amount of light per unit time of each of the first excitation light and the second excitation light entering the wavelength conversion element 451, it is possible to control the light intensity balance (the ratio of the light intensity) between the blue light component, and the green light component and the red light component in the illumination light emitted from the wavelength conversion element 451, by extension from the illumination device 31, and in addition, it is also possible to control the light intensity balance (the ratio of the light intensity) between the first excitation light and the second excitation light in the blue light component. Therefore, it is possible to control the color tone of the illumination light emitted from the illumination device 31, and by extension, the color tone of the projection image.

Further, since the color tone of the illumination light can be controlled as described above, it is also possible to perform the correction of the color misalignment due to the deterioration of the optical component, and the adjustment of the color shade corresponding to the color mode set by the user or the like. Therefore, by performing the color tone adjustment of the illumination light instead of, or in addition to the adjustment of the color tone by reducing (cutting) the light such as the adjustment of the color tone performed by the light modulation element such as a liquid crystal panel, the use efficiency of the light for forming the image can be improved, and thus, it is possible to project an image good in color reproducibility and high in luminance.

The solid-state light sources S1 constituting the first light source section 412 and the solid-state light source S2 constituting the second light source section 413 are arranged so that no bias occurs in the light intensity distribution of the first excitation light and the light intensity distribution of the second excitation light in the excitation light emitted from the array light source 411. In other words, in the wavelength conversion layer 453 of the wavelength conversion element 451, the illumination area by the first excitation light and the illumination area by the second excitation light roughly coincide with each other. According to this configuration, it is possible to homogenize the light intensity distributions of the first excitation light and the second excitation light in the illumination light emitted from the wavelength conversion element 451, by extension, from the illumination device 31 (the light source device 4), and by extension, the light intensity distributions of the blue light, the green light, and the red light. Therefore, it is possible to prevent the color variation from occurring in the illumination light, and by extension, in the projection image.

Modifications of First Embodiment

In the projector 1 described above, the wavelength conversion device 45 has the configuration including the transmissive type wavelength conversion element 451 for emitting the fluorescence obtained by converting a part of the excitation light and another part of the excitation light along the incident direction of the excitation light. However, besides this configuration, it is also possible to use a wavelength conversion device having a reflective type wavelength conversion element.

Figure 5:
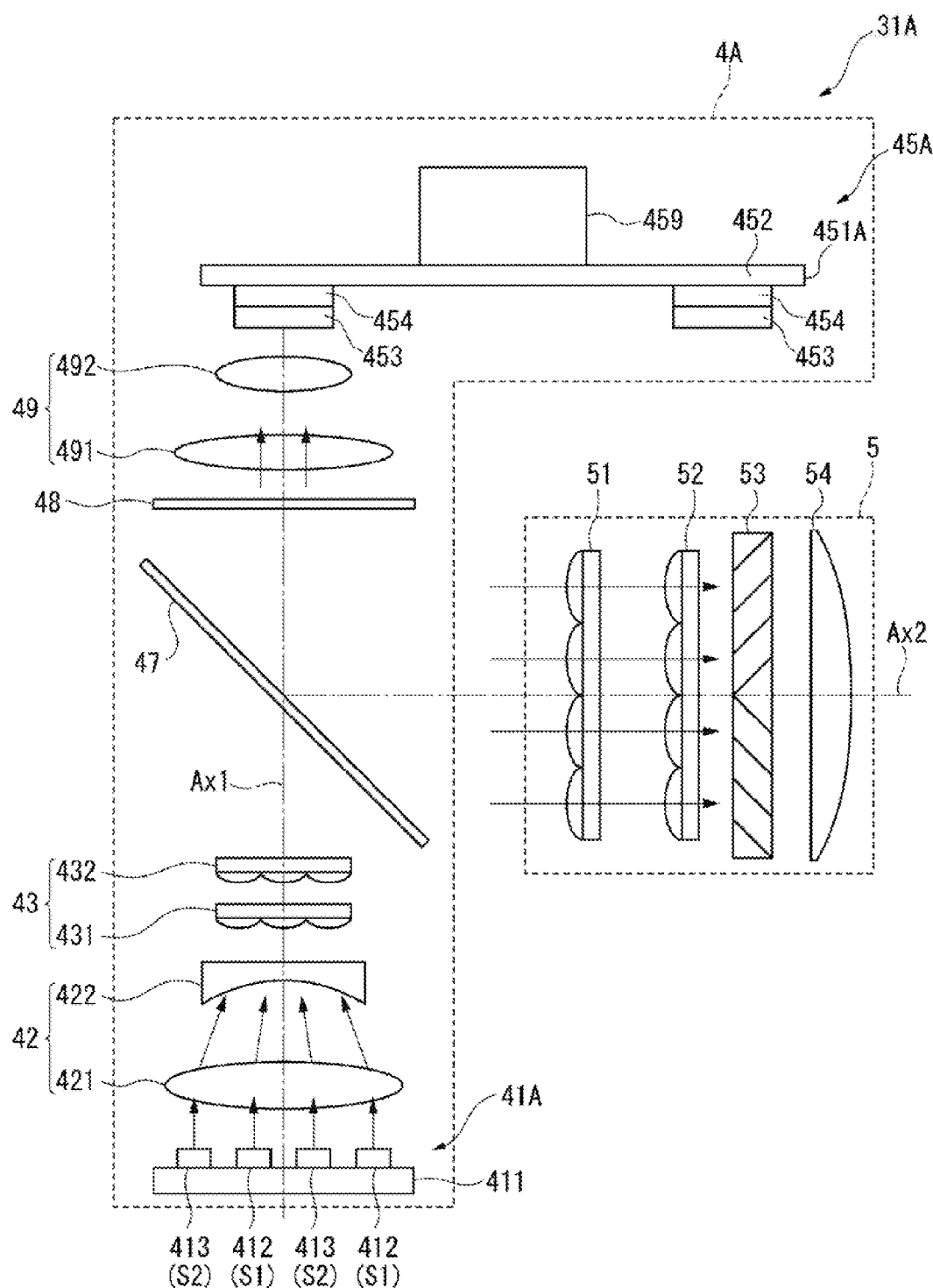
FIG. 5 is a schematic diagram showing another illumination device according to the first embodiment.

FIG. 5 is a schematic diagram showing a configuration of an illumination device 31A, which is a modification of the illumination device 31.

For example, it is possible to adopt the illumination device 31A having a reflective type wavelength conversion device 45A shown in FIG. 5 to the projector 1 instead of the illumination device 31 described above. It should be noted that in the description below, a part which is the same or substantially the same as the part having already been described is denoted by the same reference symbol, and the description thereof will be omitted.

The illumination device 31A is provided with a light source device 4A disposed on a first illumination light axis Ax1, and the homogenization device 5 described above and disposed on a second illumination light axis Ax2 perpendicular to the first illumination light axis Ax1.

The light source device 4A is provided with a light source section 41A, the a focal optical device 42, the homogenizer optical device 43, a polarization separation device 47, a wave plate 48, a pickup optical device 49, and the wavelength conversion device 45A.

Among these constituents, the light source section 41A has the array light source 411, the collimator optical device (not shown), and the lighting device 414 (not shown in FIG. 5) similarly to the light source section 41 described above. Further, the array light source 411 has the first light source section 412 including the plurality of solid-state light source S1, and the second light source section 413 including the plurality of solid-state light source S2.

In such the light source section 41A, the solid-state light sources S1, S2 are configured so as to respectively emit the first excitation light and the second excitation light each of which is either one of the s-polarized light and the p-polarized light. Specifically, the solid-state light sources S1, S2 are configured so as to respectively emit the first excitation light and the second excitation light as the p-polarized light. However, besides this configuration, it is also possible to adopt a configuration in which the solid-state light sources S1, S2 respectively emit the first excitation light and the second excitation light as the s-polarized light.

The polarization separation device 47 is located at the cross section between the first illumination light axis Ax1 and the second illumination light axis Ax2, and is tilted at an angle of 45° with the illumination light axes Ax1, Ax2. The polarization separation device 47 has a function of transmitting one of the p-polarization component and the s-polarization component included in the light with the wavelength in the blue light region out of the incident light, and reflecting the other polarization component, and in addition, has a function of reflecting the light with the wavelength in the green light region or the red light region irrespective of the polarization state. In other words, the polarization separation device 47 is provided with a wavelength-selective polarization separation characteristic.

Specifically, the polarization separation device 47 transmits the p-polarized part of the excitation light (the first excitation light and the second excitation light) which enters the polarization separation device 47 from the light source section 41A via the a focal optical device 42 and the homogenizer optical device 43. Further, the polarization separation device 47 reflects the s-polarized part of the excitation light, which passes twice through the wave plate 48 described later to be converted in polarization, toward the first lens array 51 of the homogenization device 5. Further, the polarization separation device 47 reflects the fluorescence, which is generated in the wavelength conversion device 45A and then enters the polarization separation device 47, toward the first lens array 51 of the homogenization device 5 described above.

It should be noted that the polarization separation device 47 is formed as a plate type polarization separation device, but is not limited thereto, and can also be formed as a prism type polarization separation device. Further, in the case in which the light source section 41A emits the s-polarized excitation light, it is sufficient for the polarization separation device 47 to have a configuration of transmitting the s-polarized part of the excitation light and reflecting the p-polarized part of the excitation light.

The wave plate 48 is a ¼ wave plate. The wave plate 48 converts the excitation light as the p-polarized light entering the wave plate 48 from the polarization separation device 47 into the excitation light as the circularly polarized light.

The pickup optical device 49 collects the excitation light entering the pickup optical device 49 from the wave plate 48, and then makes the excitation light thus collected enter the wavelength conversion device 45A. The pickup optical device 49 is configured including two pickup lenses 491, 492 similarly to the first pickup optical device 44 described above. However, the configuration is not limited to this example, but the number of lenses constituting the pickup optical device 49 can arbitrarily be changed.

Similarly to the wavelength conversion device 45 described above, the wavelength conversion device 45A converts a part of the excitation light entering the wavelength conversion device 45A from the pickup optical device 49 into the fluorescence and then emits the fluorescence, and at the same time emits another part thereof.

Here, the wavelength conversion device 45 is the transmissive type wavelength conversion device in which the plane of incidence of the excitation light and the exit surface of the fluorescence are opposite to each other. In contrast, the wavelength conversion device 45A is the reflective type wavelength conversion device in which the plane of incidence of the excitation light and the exit surface of the fluorescence are the same surface.

Such a wavelength conversion device 45A is provided with a wavelength conversion element 451A, and the rotary device 459 for rotating the wavelength conversion element 451A.

Similarly to the wavelength conversion, element 451, the wavelength conversion element 451A has the substrate 452 and the wavelength conversion layer 453, and in addition, has a reflecting layer 454 located between the substrate 452 and the wavelength conversion layer 453. The reflecting layer 454 reflects the excitation light entering the reflecting layer 454 through the wavelength conversion layer 453, and the fluorescence described above entering the reflecting layer 454 from the wavelength conversion layer 453 toward the wavelength conversion layer 453. Thus, the wavelength conversion element 451A emits the illumination light including the fluorescence generated in the wavelength conversion layer 453 and the excitation light having failed to be converted into the fluorescence toward the opposite direction to the incident direction of the excitation light to the wavelength conversion element 451A, namely toward the pickup optical device 49.

The illumination light is made to enter the wave plate 48 via the pickup optical device 49. When the excitation light included in the illumination light is reflected by the wavelength conversion element 451A, the excitation light turns to the circularly polarized light with the inverse rotational direction to the circularly polarized light having entered the wavelength conversion element 451A, and then passes through the wave plate 48 again. On this occasion, the excitation light having turned to the circularly polarized light with the inverse rotational direction is converted into the s-polarized excitation light having the polarization direction rotated as much as 90° with respect to the p-polarized light. Therefore, the s-polarized excitation light is reflected by the polarization separation device 47, then proceeds along the second illumination light axis Ax2, and then enters the first lens array 51 of the homogenization device 5 as the blue light.

On the other hand, the fluorescence having been emitted from the wavelength conversion element 451A is unpolarized light, and the polarization separation device 47 has the wavelength-selective polarization separation characteristic. Therefore, the fluorescence having passed through the pickup optical device 49 and the wave plate 48 is reflected by the polarization separation device 47, then proceeds along the second illumination light axis Ax2, and then enters the first lens array 51 of the homogenization device 5 as the green light and the red light.

Thus, the white illumination light is emitted from the illumination device 31A via the homogenization device 5, and then enters the color separation device 32 (see FIG. 1) described above.

Even in the case in which such the illumination device 31A as described above is adopted in the projector 1 described above instead of the illumination device 31, substantially the same advantages as described above can be obtained.

Second Embodiment

Then, a second embodiment of the invention will be described.

The projector according to the present embodiment has substantially the same configuration as the projector 1 described above, but the wavelength conversion device provided to the projector according to the present embodiment further includes a reflecting layer different in transmittance of the incident light by the wavelength. In this point, the projector according to the present embodiment and the projector 1 described above are different from each other. It should be noted that in the description below, a part which is the same or substantially the same as the part having already been described is denoted by the same reference symbol, and the description thereof will be omitted.

Figure 6:
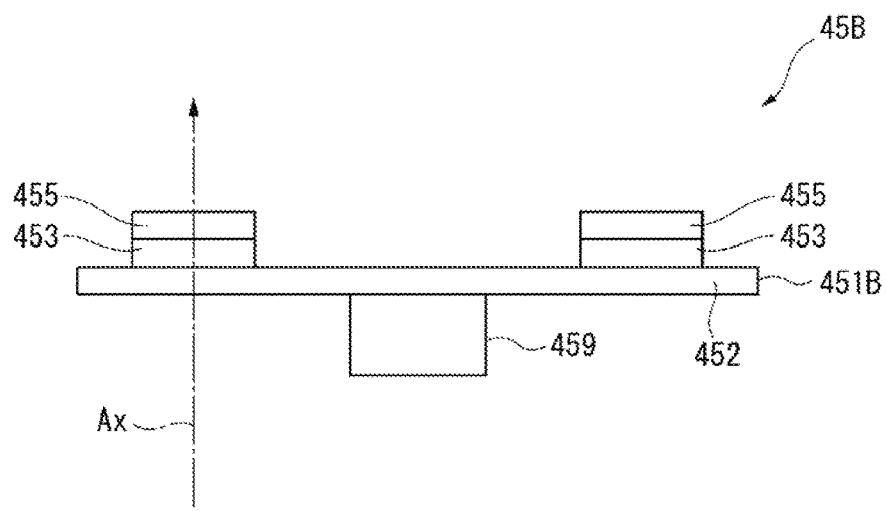
FIG. 6 is a schematic diagram showing a wavelength conversion device of a projector according to a second embodiment of the invention.

FIG. 6 is a schematic diagram showing a wavelength conversion device 45B provided to the projector according to the present embodiment.

The projector according to the present embodiment has substantially the same configuration and functions as those of the projector 1 described above except the point that the projector according to the present embodiment is provided with the wavelength conversion device 455 instead of the wavelength conversion device 45. Further, as shown in FIG. 6, the wavelength conversion device 455 has substantially the same configuration and functions as those of the wavelength conversion device 45 described above except the point of that the wavelength conversion device 455 includes a wavelength conversion element 451B instead of the wavelength conversion element 451.

The wavelength conversion element 451B further includes a reflecting layer 455 located on the light exit side of the wavelength conversion layer 453 in addition to the substrate 452 and the wavelength conversion layer 453.

Figure 7:
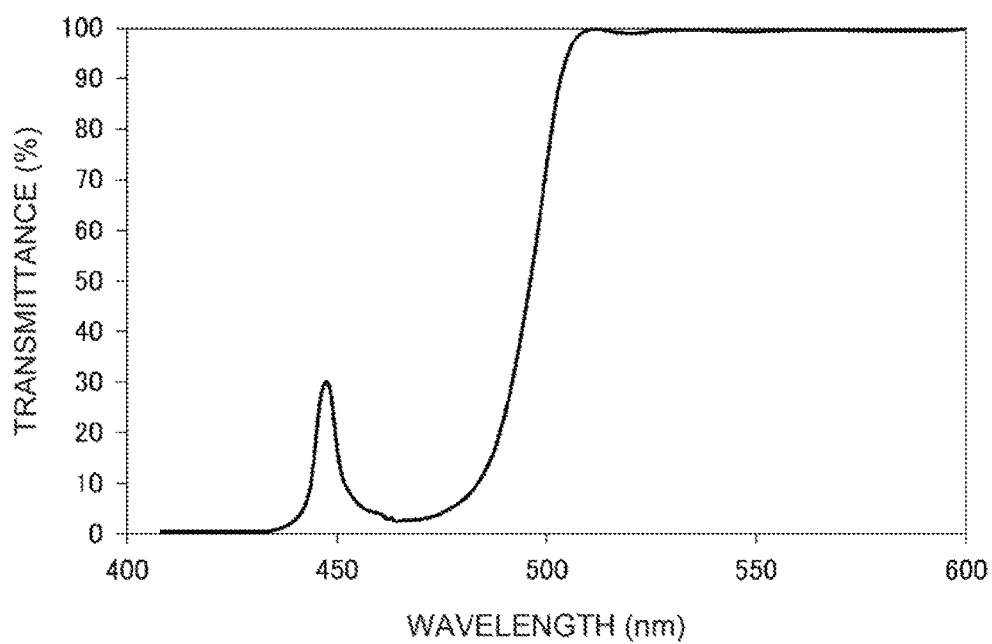
FIG. 7 is a diagram showing a relationship between the wavelength and the transmittance of the light entering a reflecting layer in the second embodiment.

FIG. 7 is a diagram (a graph) showing a relationship between the wavelength and the transmittance of the light entering the reflecting layer 455.

The reflecting layer 455 corresponds to a reflecting section according to the invention, and is a reflecting layer different in transmittance (reflectance) of the incident light by the wavelength of the incident light.

Specifically, the transmittance of the reflecting layer 455 has a characteristic of having a peak in the vicinity of 440 nm, rapidly decreasing from about 450 nm, and then rapidly increasing from about 490 nm to reach about 100% in the range equal to or longer than 500 nm. For example, the transmittance of the reflecting layer 455 with respect to the light with the wavelength of 440 nm is about 30%, the transmittance of the reflecting layer 455 with respect to the light with the wavelength of 460 nm is about 5%, and the transmittance of the reflecting layer 455 with respect to the light with the wavelength of 500 nm is about 100%.

In the case in which the first excitation light described above having the wavelength of 460 nm enters the reflecting layer 455, roughly 5% of the first excitation light is transmitted, and the remaining roughly 95% is reflected.

In contrast, in the case in which the second excitation light described above having the wavelength of 440 nm enters the reflecting layer 455, roughly 30% of the second excitation light is transmitted, and the remaining roughly 70% is reflected.

On the other hand, in the case which the fluorescence described above having the wavelength in the range of 500 through 700 nm enters the reflecting layer 455, roughly 100% of the fluorescence is transmitted.

As described above, since the reflecting layer 455 has the transmission characteristic described above, by the control section 417 described above controlling the lighting states of the first light source section 412 and the second light source section 413 using the first lighting section 415 and the second lighting section 416 to control the emission amount per unit time of each of the first excitation light and the second excitation light, it is possible to control the light intensity balance (the ratio of the light intensity) between the excitation light component (the blue light component) and the fluorescence component (the green light component and the red light component) in the illumination light emitted from the reflecting layer 455. Besides the above, it is also possible to control the light intensity balance (the ratio of the light intensity) between the first excitation light and the second excitation light in the blue light component. Therefore, it is possible to control the color tone of the illumination light emitted from the illumination device 31, and by extension, the color tone of the projection image.

On this occasion, since the wavelength conversion layer 453 includes the phosphor described above, by controlling the light intensity of each of the first excitation light and the second excitation light, it is possible to control the ratio between the excitation light component (the blue light component) and the fluorescence component (the green light component and the red light component) in the illumination light in more detail. Therefore, it is possible to enlarge the control range of the color tone of the illumination light, and by extension, the control range of the color tone of the projection image, to a larger range.

Further, since the color tone of the illumination light can be controlled as described above, it is also possible to perform the correction of the color misalignment due to the deterioration of the optical component, and the adjustment of the color shade corresponding to the color mode as described above. Therefore, since it is possible to perform the color tone adjustment of the illumination light instead of, or in addition to the adjustment of the color tone by reducing (cutting) the light, the use efficiency of the light for forming the image can be improved, and thus, it is possible to project an image good in color reproducibility and high in luminance.

It should be noted that in the projector according to the present embodiment, there is adopted the transmissive type wavelength conversion device 45B for emitting a part of the excitation light and the fluorescence along the incident direction of the excitation light as in the case of the wavelength conversion device 45. However, besides the above, it is also possible to configure the wavelength conversion device 45B as a reflective type wavelength conversion device such as the wavelength conversion device 45A described above. In this case, it is sufficient to dispose the reflecting layer 455 on the incident side (the opposite side to the reflecting layer 454) of the excitation light to the wavelength conversion layer 453. However, in this case, in the case in which the reflecting layer 455 has the transmission characteristic shown in FIG. 7 described above, when the first excitation light enters the wavelength conversion device, roughly the whole of the first excitation light is reflected by the reflecting layer 455, and thus, the excitation light component (the blue light component) in the illumination light to be emitted becomes apt to increase. Therefore, in such a case, it is possible to use the reflecting layer 455 having the transmittance of the light with the wavelength corresponding to the first excitation light higher than the transmittance in the transmission characteristic shown in FIG. 7.

Further, as described above, the transmission characteristic of the reflecting layer 455 shown in FIG. 7 is illustrative only, and the transmission characteristic adopted in the reflecting layer 455 can arbitrarily be changed. For example, the transmittance of the light with the wavelength corresponding to the first excitation light can also be higher than the transmittance of the light with the wavelength corresponding to the second excitation light.

According to the projector related to the present embodiment described hereinabove, in addition to the advantages substantially the same as those of the projector 1 described above, the following advantages can be obtained.

The wavelength conversion device 45B includes the reflecting layer 455 located on the emission side of the fluorescence with respect to the wavelength conversion element 451B (the wavelength conversion layer 453). The reflecting layer 455 has the characteristic of transmitting the fluorescence, and reflecting a part of each of the first excitation light and the second excitation light, and in the reflecting layer 455, the transmittance (the reflectance) of the first excitation light and the transmittance (the reflectance) of the second excitation light are different from each other. Further, the control section 417 described above controls the amount of light per unit time of each of the first excitation light and the second excitation light entering the wavelength conversion element 451B. According to this configuration, the light intensity balance between the blue light component, and the green light component and the red light component in the illumination light emitted from the wavelength conversion element 451B, and by extension, from the illumination device 31 (the light source device 4) can be controlled, and in addition, the light intensity balance between the first excitation light and the second excitation light in the blue light component can also be controlled as described above. Therefore, the color tone of the illumination light emitted from the illumination device 31 can surely be controlled. Further, as described above, it is possible to project the image good in color reproducibility and high in luminance.

Modifications of Embodiments

The invention is not limited to each of the embodiments described above, but includes modifications, improvements, and so on in the range in which the advantages of the invention can be achieved.

In the first embodiment described above, it is assumed that the wavelength conversion device 45 (the wavelength conversion element 451) has the wavelength conversion layer 453 including the phosphor different in absorption ratio by the wavelength of the excitation light entering the phosphor, and different in emission efficiency of the fluorescence by the wavelength of the excitation light. Further, in the second embodiment described above, it is assumed that the wavelength conversion device 45B (the wavelength conversion element 451B) includes the reflecting layer 455 having the transmission characteristic in which the transmittance differs by the wavelength of the light entering the reflecting layer 455. However, besides this configuration, it is also possible to use a wavelength conversion layer roughly constant in conversion efficiency into the fluorescence with respect to the wavelength of the excitation light entering the wavelength conversion layer, and the reflecting layer 455 described above can also be eliminated. In other wards, it is sufficient that the amount of light per unit time of the first excitation light and the amount of light per unit time of the second excitation light entering the wavelength conversion element can be controlled.

According to such a configuration, it is possible to control the light intensity balance between the first excitation light and the second excitation light in the illumination light emitted from the wavelength conversion element 451, and by extension, from the illumination device (the light source device 4). Further, since the first excitation light and the second excitation light are different in peak wavelength (460 nm and 440 nm) from each other, by controlling the light intensity balance, the color tone of the illumination light emitted from the illumination device (the light source device) can be controlled. Further, therefore, since the projector can project the image based on the illumination light with the color tone controlled, it is possible to project an image having the color tone corresponding to the purpose, and thus, the convenience of the projector can be improved.

Further, in the second embodiment described above, the wavelength conversion element 451B (the wavelength conversion device 45B) having the wavelength conversion layer 453 different in the emission efficiency by the wavelength of the excitation light entering the wavelength conversion layer 453, and the reflecting layer 455 different in transmittance by the wavelength of the light entering the reflecting layer 455 is applied to the projector. However, besides this configuration, in the case in which the wavelength conversion element has the reflecting layer 455, it is also possible to adopt the wavelength conversion layer having the emission efficiency roughly constant with respect to the wavelength of the excitation light entering the wavelength conversion layer instead of the wavelength conversion layer 453. Also in this case, the advantage described above due to the possession of the reflecting layer 455 can be obtained.

In each of the embodiments described above, it is assumed that the wavelength conversion devices 45, 45B respectively have the transmissive type wavelength conversion elements 451, 451B, and the wavelength conversion device 45A has the reflective type wavelength conversion element 451A includes the reflecting layer 454. Further, it is assumed that these wavelength conversion elements 451, 451A, and 451B are rotated around the rotational axis Rx coinciding with the central axis of each of the wavelength conversion elements 451, 451A, and 451B by the rotary device 459. However, besides the above, it is also possible for the wavelength conversion devices 45, 45A, and 45B not to be provided with the rotary device 459, and it is also possible for the wavelength conversion elements 451, 451A, and 451B not to be rotated.

Figure 8:
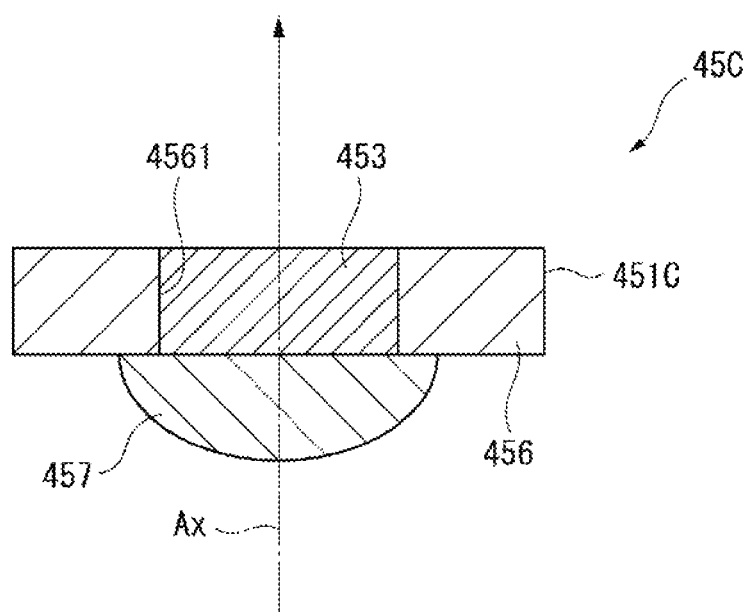
FIG. 8 is a diagram schematically showing a cross-section of modification of the wavelength conversion device in each of the embodiments describe above.

FIG. 8 is a diagram schematically showing a cross-section of a wavelength conversion device 45C.

For example, it is possible to adopt the wavelength conversion device 45C shown in FIG. 8 in the illumination device 31 or the projector 1 instead of the wavelength conversion device 45. The wavelength conversion device 45C is provided with a wavelength conversion element 451C, and the wavelength conversion element 451C has a substrate 456, the wavelength conversion layer 453, and a lens 457.

Among these constituents, the substrate 456 has an opening section 4561 at the center thereof, and the wavelength conversion layer 453 described above is disposed in the opening section 4561. Such the substrate 456 can be formed of metal or ceramic.

The lens 457 is located on the incident side of the excitation light to the wavelength conversion layer 453, and collects the excitation light entering the lens 457 from the first pickup optical device 44 described above to make the excitation light thus collected enter the wavelength conversion layer 453. It should be noted that such the lens 457 can also be eliminated.

Even in the case in which such the wavelength conversion device 45C as described above is adopted in the projector 1 instead of the wavelength conversion device 45, substantially the same advantages as in the projector 1 can be obtained.

It should be noted that by disposing the reflecting layer 454 on the opposite side to the incident side (the side on which the lens 457 is disposed) of the excitation light to the wavelength conversion layer 453, it is possible to configure the reflective type wavelength conversion device. Further, it is also possible to configure a wavelength conversion device having the reflecting layer 455 described above disposed on the incident side (between the wavelength conversion layer 453 and the lens 457, or on the incident side of the excitation light to the lens 457) of the excitation light to the wavelength conversion layer 453, and adopt the wavelength conversion device instead of the wavelength conversion device 45B. In this case, it is possible to obtain substantially the same advantages as those of the projector described in the second embodiment described above.

In each of the embodiments described above, there is adopted the configuration in which the emission efficiency of the fluorescence due to the first excitation light and the emission efficiency of the fluorescence due to the second excitation light in the wavelength conversion elements 451, 451A are made different from each other due to the absorption ratio to the phosphor different between the first excitation light and the second excitation light. However, besides this configuration, it is also possible to adopt a configuration of mating the emission efficiencies described above different from each other by, for example, changing the composition of the phosphor to thereby make the conversion efficiency of the first excitation light into the fluorescence and the conversion efficiency of the second excitation light into the fluorescence different from each other. In other words, it is sufficient that the emission efficiency of the fluorescence due to the first excitation light and the emission efficiency of the fluorescence due to the second excitation light are different from each other.

In each of the embodiments described above, it is assumed that the number of the solid-state light sources S1 constituting the first light source section 412 and the number of the solid-state light sources S2 constituting the second light source section 413 are equal to each other. However, besides this configuration, the number of the solid-state light sources S1 and the number of the solid-state light sources S2 can also be different from each other. Further, it is sufficient for the peak wavelength of the light emitted from each of the solid-state light sources S1 and the peak wavelength of the light emitted from each of the solid-state light sources S2 to be different from each other, and the peak wavelengths are not limited to 460 nm and 440 nm. Further, the arrangement of the solid-state light sources (e.g., the solid-state light sources S1) constituting the first light source section and the solid-state light sources (e.g., the solid-state light sources S2) constituting the second light source section is not limited to the example described above, but can arbitrarily be changed.

In each of the embodiments described above, LD is adopted as the solid-state light sources S1, S2 constituting the first light source section 412 and the second light source section 413. However, besides this configuration, it is also possible to provide at least one of the first light source section 412 and the second light source section 413 with a configuration of having other solid-state light sources such as a light emitting diode (LED), or a configuration having LD and LED mixed.

Further, in each of the embodiments described above, it is assumed that the light source section 41 has the configuration including the first light source section 412 for emitting the first excitation light having the peak wavelength at 460 nm and the second light source section 413 for emitting the second excitation light having the peak wavelength at 440 nm. However, besides this configuration, it is also possible to provide the light source section 41 with a configuration having three or more light source sections for emitting respective light (excitation light) different in wavelength from each other. In this case, it is also possible to provide lighting sections for individually controlling the respective light source sections such as the first lighting section and the second lighting section to the respective light source sections. Further, among the three or more light source sections, it is possible to perform the same lighting control on some light source sections, and perform individual lighting control on the remaining light source sections.

In each of the embodiments described above, it is assumed that the projector 1 is equipped with the three light modulation devices 34 (34R, 34G, and 34B) each configured including the liquid crystal panel. However, besides this configuration, the invention can also be applied to a projector equipped with two or less, or four or more light modulation devices 34.

In the embodiments described above, it is assumed that the image projection device 3 is provided with the configuration described above. However, this configuration is not a limitation, the configuration of the image projection device 3 described above is illustrative only, and the plurality of optical components constituting the image projection device 3 and the arrangement of the plurality of optical components can arbitrarily be changed.

In each of the embodiments described above, there are adopted the transmissive type liquid crystal panels, which have the plane of incidence of light and the light exit surface different from each other, as the light modulation devices 34. However, besides this configuration, it is also possible to adopt reflective type liquid crystal panels, which have the plane of incidence of light and the light exit surface coinciding with each other, as the light modulation devices 34. Further, it is also possible to use a light modulation device other than the liquid crystal, such as a device using a micro mirror device such as a digital micromirror device (DMD) providing the light modulation device is capable of modulating the incident light beam to form the image corresponding to the image information. In the case in which such the device is used, it is also possible to use such the device for each of the colored light beams separated by the color separation device 32.

In each of the embodiments described above, there is cited an example of applying the light source device 4 and the illumination device 31 equipped with the light source device 4 to the projector. However, besides this example, it is also possible to adopt the light source device 4 and the illumination device 31 into other electronic apparatuses such as lighting equipment or a headlight of a vehicle.

The entire disclosure of Japanese Patent Application No. 2016163343, filed Aug. 24, 2016 is expressly incorporated by reference herein.

What is claimed is:
1. An illumination device comprising:
a first light source section configured to emit first colored light having a peak wavelength at a first wavelength;
a second light source section configured to emit second colored light having a peak wavelength at a second wavelength different from the first wavelength;
a wavelength conversion element configured to convert a part of the first colored light and a part of the second colored light into third colored light different in wavelength from the first colored light and the second colored light, and then emit another part of the first colored light, another part of the second colored light, and the third colored light; and
a control section configured to individually control an amount of light per unit time of the first colored light emitted from the first light source section, and an amount of light per unit time of the second colored light emitted from the second light source section, wherein:
the wavelength conversion element includes:
a characteristic that a first emission efficiency in emitting the third colored light from the first colored light entering the wavelength conversion element and a second emission efficiency in emitting the third colored light from the second colored light entering the wavelength conversion element are different from each other; and
a phosphor that emits fluorescence in response to the first colored light and the second colored light;
by controlling the amount of light per unit time of the first colored light and the amount of light per unit time of the second colored light, the light intensity balance among the first colored light, the second colored light, and the fluorescence that are emitted from the wavelength conversion element is controlled.

2. The illumination device according to claim 1, further comprising:
a reflecting section located on an exit side of the third colored light with respect to the wavelength conversion element, and configured to transmit the third colored light and reflect a part of the first colored light and a part of the second colored light,
wherein the reflecting section has a characteristic that transmittance of the first colored light and transmittance of the second colored light are different from each other.

3. A projector comprising:
the illumination device according to claim 2;
a light modulation device configured to modulate light emitted from the illumination device; and
a projection optical device configured to project the light modulated by the light modulation device.

4. The illumination device according to claim 1, wherein an illumination area by the first colored light and an illumination area by the second colored light in the wavelength conversion element roughly coincide with each other.

5. A projector comprising:
the illumination device according to claim 4;
a light modulation device configured to modulate light emitted from the illumination device; and
a projection optical device configured to project the light modulated by the light modulation device.

6. A projector comprising:
the illumination device according to claim 1;
a light modulation device configured to modulate light emitted from the illumination device; and
a projection optical device configured to project the light modulated by the light modulation device.

* * * * *